May 1, 1956 H. C. JACOBSON Re. 24,147

HAMMER MILL WITH PLURAL SCREENS OF DIFFERENT MESH

Original Filed March 13, 1950 4 Sheets-Sheet 1

Inventor

HOWARD C. JACOBSON

By Chas. C. Reif.

Attorney

HAMMER MILL WITH PLURAL SCREENS OF DIFFERENT MESH

Original Filed March 13, 1950 4 Sheets-Sheet 2

Inventor

HOWARD C. JACOBSON

By Chas. C. Reif

Attorney

May 1, 1956 H. C. JACOBSON Re. 24,147

HAMMER MILL WITH PLURAL SCREENS OF DIFFERENT MESH

Original Filed March 13, 1950 4 Sheets-Sheet 3

Inventor

HOWARD C. JACOBSON

By Chas. C. Reif

Attorney

HAMMER MILL WITH PLURAL SCREENS OF DIFFERENT MESH

Original Filed March 13, 1950 4 Sheets-Sheet 4

Inventor

HOWARD C. JACOBSON

By Chas. C. Reif

Attorney

United States Patent Office

Re. 24,147
Reissued May 1, 1956

24,147

HAMMER MILL WITH PLURAL SCREENS OF DIFFERENT MESH

Howard C. Jacobson, Minneapolis, Minn.

Original No. 2,640,650, dated June 2, 1953, Serial No. 149,403, March 13, 1950. Application for reissue November 23, 1954, Serial No. 476,099

8 Claims. (Cl. 241—89)

Matter enclosed in heavy brackets [ ] appears in the original patent but forms no part of this reissue specification; matter printed in italics indicates the additions made by reissue.

This invention relates to a grinding mill, and while the invention might be applicable to various types of grinding mills, it is particularly designed for use in what is known as a "hammer mill." Such hammer mills commonly comprise a casing, a rotatable beater therein, a screen extending circumferentially about said beater at the lower side thereof, which screen is usually removable and through which the comminuted material passes. Such mills are very frequently used in the buildings of smaller milling companies where the customers, usually farmers, bring the grain to be ground. The mill itself is usually located on one floor while the discharge means for the ground grain is located on an upper floor. The customer often wants parts of the grain ground into different degrees of fineness. With the usual type of mill it was necessary to go down to the mill on the lower floor and change the above mentioned screen so as to use screens of different mesh to produce the different grinds.

It is an object of this invention to provide a structure of grinding mill which will enable the operator to change the structure to provide products of different degrees of fineness from the upper floor so that it will not be necessary for him to go down to the mill.

It is a further object of the invention to provide a grinding mill, preferably of the hammer mill type, which comprises a casing, a rotatable means in said casing for comminuting the material, and a plurality of screens of different mesh disposed about said rotatable means, together with means for rendering one or more of said screens operative or inoperative.

It is another object of the invention to provide a hammer mill comprising a casing, a rotatable beater therein, a screen extending circumferentially about said beater at the lower side thereof which is preferably easily removable, a pair of screens of different mesh disposed at either side of said beater at the upper portion thereof, said screens preferably converging upwardly, said last mentioned screens preferably being fixed in position so as always to be in place, together with plates for covering said last mentioned screen for rendering the same inoperative, and means extending to the floor above the floor on which the mill is located for moving either of said plates to expose either of said last mentioned screens and render the same operative.

*It is still another object of the invention to provide a grinding mill comprising a casing, a rotatable means comprising groups of swingable beater blades, a semi-cylindrical screen at one location about said means, means securing said screen in place for affording easy removal of said screen, one or more screens at another location about said first mentioned means and at the sides thereof respectively, said latter screen or screens being of different mesh than said first mentioned screen, and means securing said last mentioned screen or screens in*

*place so that they can be removed and replaced by other screens.*

These and other objects and advantages of the invention will be fully set forth in the following description made in connection with the accompanying drawings in which like reference characters refer to similar parts throughout the several views and in which.

Figure 1:
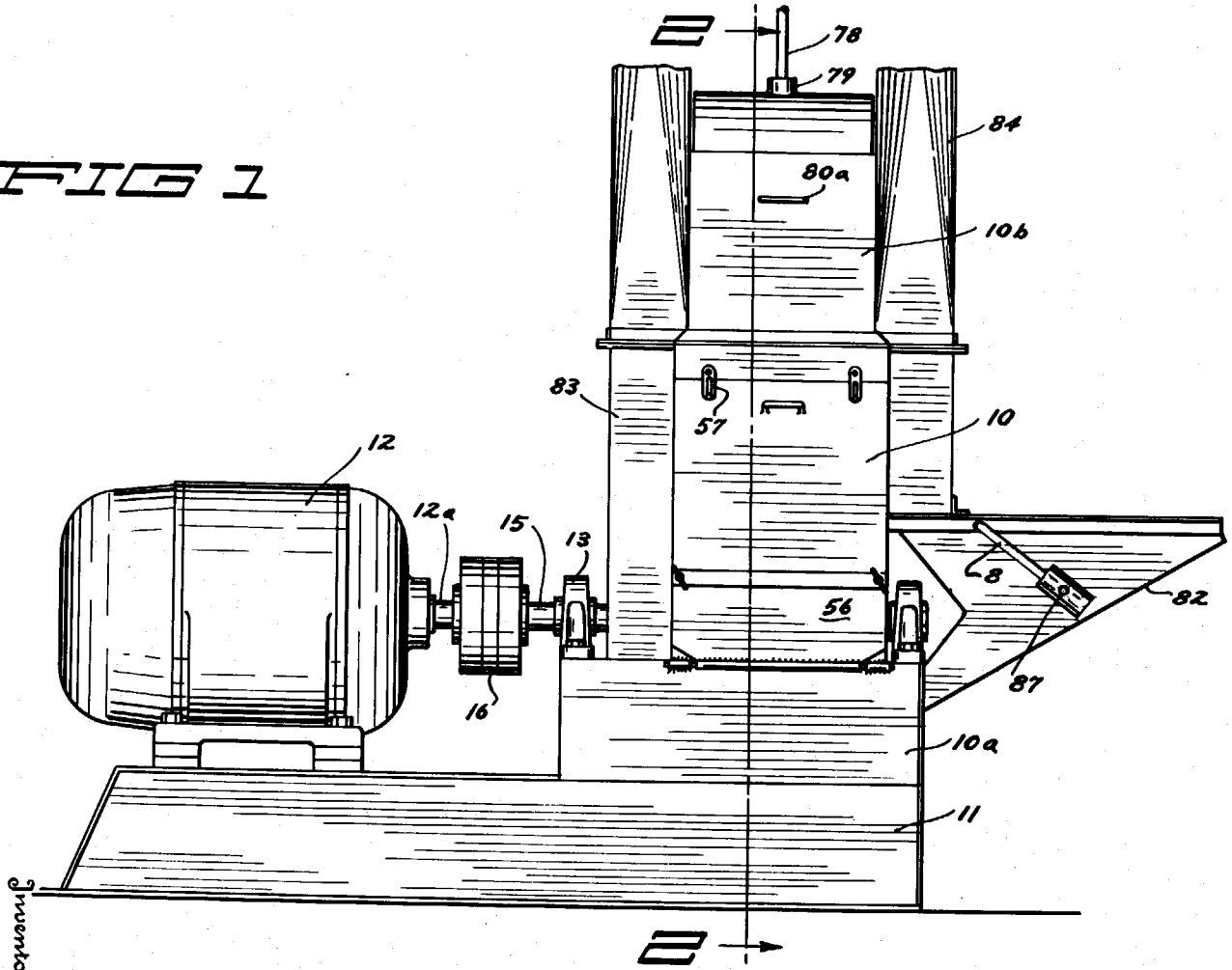
Fig. 1 is a view in side elevation of the mill of this invention.

Referring to the drawings, a grinding mill of the hammer mill type is shown comprising a casing 10. This casing is supported on a base member 11 which also supports an electric motor 12. Casing 10 has bearings 13 at each end thereof supported upon the top of a portion 10a of the casing in which bearings is journaled a driving shaft 15. Shaft 15 is connected by a coupling 16 to the driving shaft 12a of motor 12. Secured to shaft 15 are a plurality of plates 18 shown as in groups of three and four which are disposed at right angles to each other. The plates 18 are respectively secured to a hub 18a which is in turn secured to shaft 15. Outer plates 20 and 21 are secured to shaft 15, the same being held against the ends of hub 18a by nuts 23 threaded on shaft 15. The plates 18, 20 and 21 support rods 24 extending transversely therethrough and therebetween which in turn have swingingly mounted thereon beater arms *or hammers* 25. Arms 25 are shown as having holes 25a extending therethrough so that said arms can be reversed and have the rods 24 extend through the openings 25a. Other similar rods 27 extend between certain of the plates 18 and plate 21 being supported therein and rods 27 also carry series of the beater arms *or hammers* 25. Shaft 15 is driven by motor 12 and the rotatable beater comprising members 18 to 25 acts to comminute the material to be ground.

Figure 7:
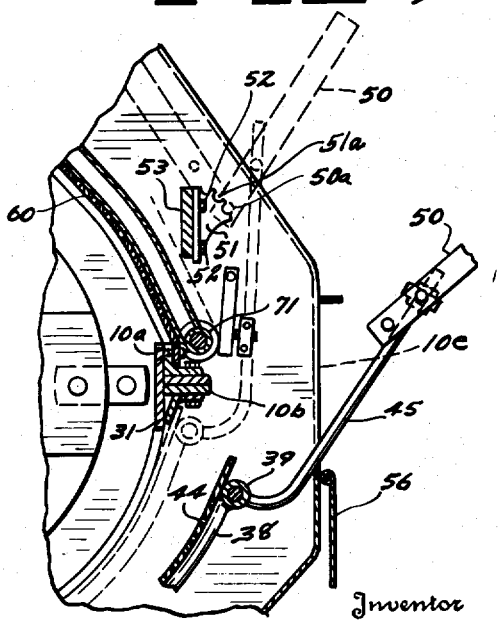
Fig. 7 is a vertical section taken on line 7—7 of Fig. 6, as indicated by the arrows, some parts being shown in different positions in dotted lines.

A screen 30, shown as of semi-cylindrical form, is disposed circumferentially about the lower side of the rotatable beater, the upper ends of said screen engaging the downwardly converging sides of angle members 31 secured to plates 10b forming part of the casing. A rod 33 extends longitudinally of screen 30 adjacent one plate 31 and is carried in a sleeve 34 having secured thereto projecting arms 35 which are pivotally connected to arms 36 pivotally secured at their other ends in casing 10. A semi-circular rod 38, which is circular in cross section, is connected to sleeve 34 and extends centrally beneath screen 30 and is secured at its other end to a sleeve or hub 39 through which passes a rod 40 also passing through sleeves or hubs 41 at each side of sleeve 39 and through sleeves 42 at the outer ends of sleeves 40 and 41, which latter sleeves have connected thereto narrow rods or strips 44. The sleeves 41 have secured thereto the lower ends of bent rods 45 which extend upwardly and through a bar 47 to which they are secured by nuts 48 threaded on the ends of said rods and engaging opposite sides of bar 47. Bar 47 has reduced ends which are disposed in the sides of a bail 50 having pins 50a projecting outwardly from the lower portion of its straight sides, which pins are adapted to be received in either one of a plurality of recesses 51a formed in a bracket 51 secured by bolts 52 to a bar 53 extending transversely between the ends 10c of casing 10. When the parts are in the position shown in Fig. 2 with the pins 50a in recesses 51a, screen 30 is held tightly in operative position with its inner side engaging spaced semi-circular members 55 secured to plates 10d forming part of the casing. When it is desired to remove screen 30, bail 50 can be lifted to remove pins 50a from recesses 51a and rods 45 can be swung to the position shown in Fig. 7 where they rest against the bottom of an opening 10e of the casing which is normally closed by a door 56. Screen 30 can then be easily removed if it is desired to insert a screen of different mesh. Casing 10 also has an opening 10f at the opposite side thereof normally closed by a door 58. Doors 56 and 58 are held in closed position by swinging buttons 57.

Figure 2:
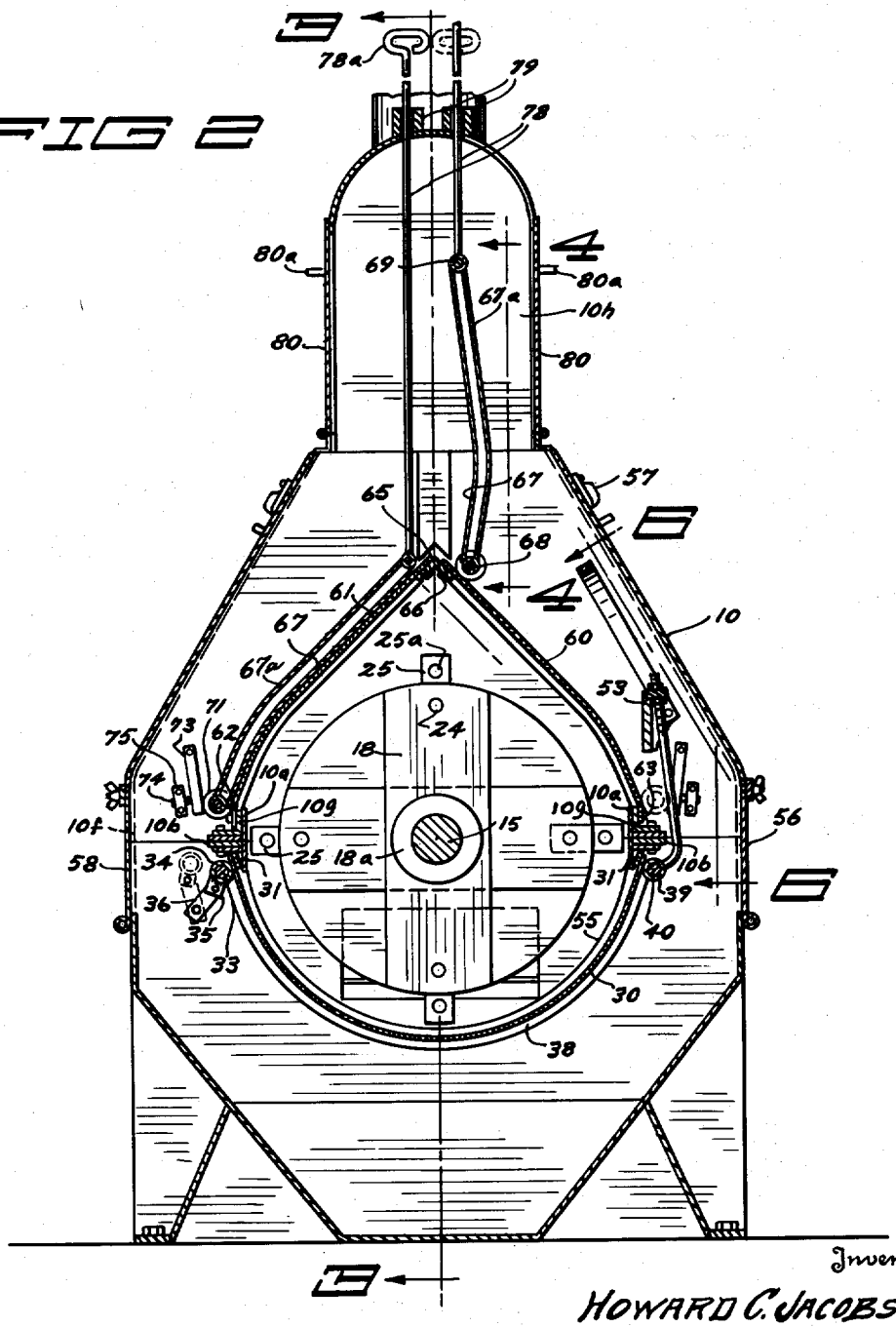
Fig. 2 is a vertical section taken substantially on line 2—2 of Fig. 1, as indicated by the arrows.

In accordance with the present invention, a pair of screens 60 and 61 are provided which are disposed at either side of the rotatable beater at the upper portion thereof, and in the embodiment of the invention illustrated, screens 60 and 61 converge upwardly. Screens 60 and 61 are designed to be always in place in contrast to screen 30 which is arranged for quick and easy removal. The lower ends of screens 60 and 61 are secured to angle members 62 connected by bolts 63 to the angle members 10g forming part of the casing. Screens 60 and 61 at their upper ends are secured to the diverging top surfaces of an angle member 65 by the bolts 66. Angle member 65 extends between the ends 10c of casing 10. *While screens 60 and 61 are not removed frequently, it is obvious that they are readily removable by removing the bolts 63 and 66 by which they are secured in place so that screens of different mesh could thus be used.* [The screens 60 and 61 will be made of different mesh or have different sized holes therethrough.] The holes in screens 60 and 61 will [also preferably] be *made* of different size than the holes in screen 30. Respectively overlying the screens 60 and 61 are plates 67. Plates 67 are similar except that they are reversely disposed, as shown in Fig. 2. Each plate 67 is secured at its lower end to a cylindrical or tubular member 68, and at its upper end is secured to a cylindrical or tubular member 69. Plates 67a are also secured to members 68 and 69 and are spaced slightly from plates 67 and extend parallel thereto. Members 68 have spaced rollers 71 at their lower ends and these at their outer sides engage inwardly inclined bars 73 pivotally connected at their upper ends to the ends of casing 10 and engaged at their lower ends by set screws 74 threaded into small brackets 75 secured to the ends of casing 10. The members 69 at the upper ends of plates 67 and 67a are pivotally connected to rods 78 which extend upwardly through the upper portion 10h of casing 10 which is shown as having a semi-cylindrical top. Rods 78 extend through lugs or bosses 79 secured to the top of portion 10h and said rods are provided with handle portions 78a at their upper ends. The rods 78 will extend to the floor above that on which base member 11 is supported. Portion 10h is shown as having doors 80 at either side thereof hinged at their lower ends and provided with handles 80a.

Casing 10 has an opening 10i at one end forming a feed opening and through which the material to be ground is directed by the bottom of a chute or hopper 82 which extends at one end of the casing. A chamber 10j is formed in casing 10 at the outer side of the screens 30, 60 and 61. An air conduit 83 is provided, which in the embodiment of the invention illustrated is shown as disposed at one end of casing 10, and said conduit communicates at its lower end with the bottom of chamber 10j. Conduit 83 is adapted to extend to an air separator at its upper end (not shown), which may be of the centrifugal or other type. Another conduit 84 is provided which in the embodiment of the invention illustrated is disposed at the other end of casing 10 from conduit 83, and the same extends down to the top of hopper 82. Hopper 82 has an outwardly extending bottom portion 82a at its inner side which extends to one side of chute 84. A plate 85 is pivotally mounted on a rod 86 at its upper end, said plate being freely swingable and being bent at an angle intermediate its ends so that its lower end can swing against the downwardly and inwardly inclined portion 82b of hopper 82. Rod 86 extends to one side of hopper 82 and is directed downwardly and outwardly away from casing 10 and provided with a weight 87 which may be disposed at different positions on rod 86. Conduit 84 will extend from the separator to which reference has above been made.

Figure 3:
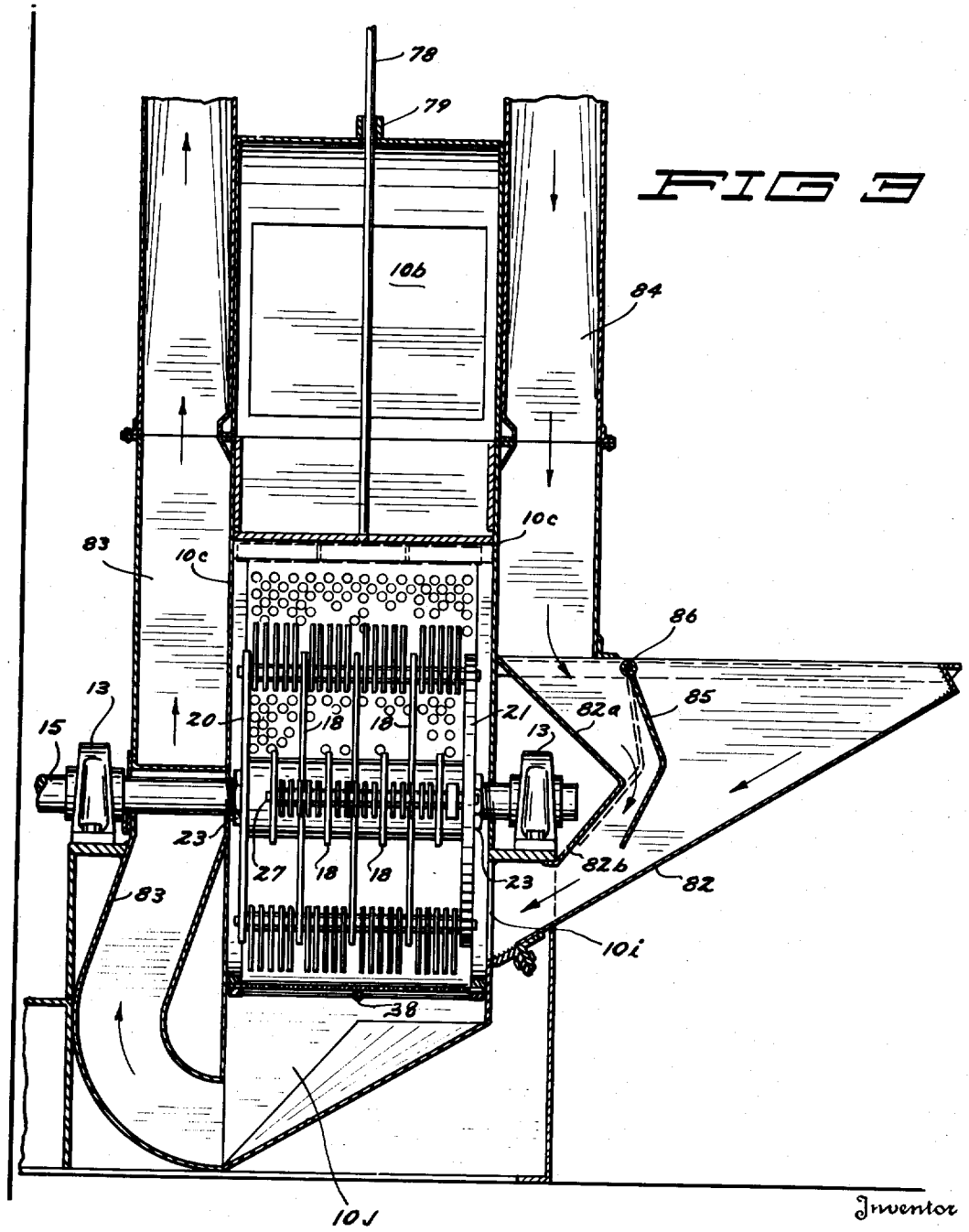
Fig. 3 is a vertical section taken substantially on line 3—3 of Fig. 2, as indicated by the arrows.
Figure 4:
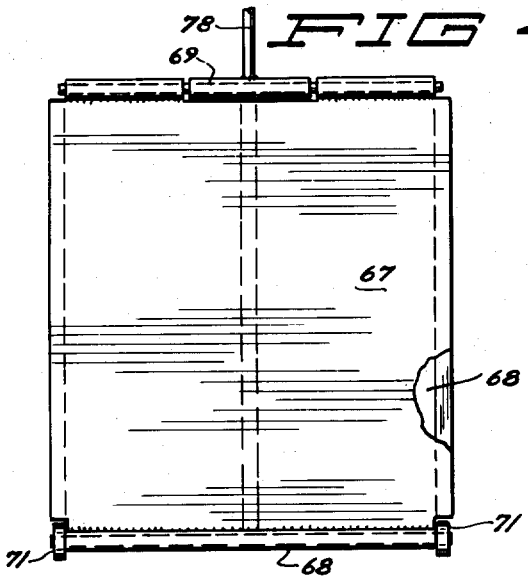
Fig. 4 is a view in front elevation of a plate used, a portion being broken away.
Figure 5:
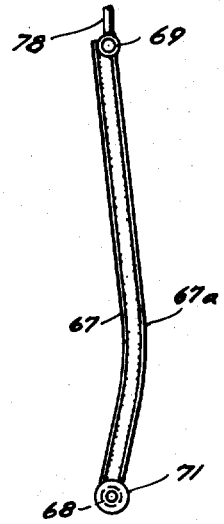
Fig. 5 is a view as seen from the right of Fig. 4.
Figure 6:
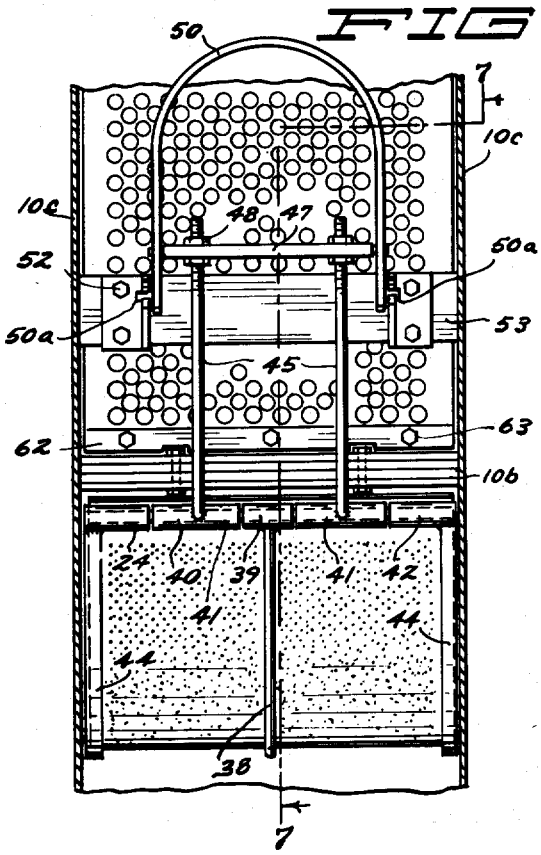
Fig. 6 is a substantially vertical section taken on line 6—6 of Fig. 2, as indicated by the arrows.

In operation, motor 12 will be operated and shaft 15 and the beater comprising members 18 to 25 will be rotated at high speed. The speed of such beaters varies from about 1500 to 3600 revolutions per minute. The material or grain to be ground is placed in the chute or hopper 82 and in the usual arrangement the grain is delivered from the wagons to a chute extending to the outside of the mill which conveys it to hopper 82. The ground material is delivered at the floor above that on which base member 11 rests and is sacked at this upper floor. The material is struck by the beater arms 25 and driven against the sides of the casing and screen 30 until it is sufficiently fine to pass through screen 30 or one of the other screens if the latter is operative. Should the customer desire a coarser grind than screen 30 produces, the operator on the floor above will pull up on one handle 78a and will move upwardly rod 78, say the one at the right as seen in Fig. 2, and plates 67 and 67a will be moved upwardly to the position shown in Fig. 2. Rollers 68 will roll along the outer ends of screen 60. The material will now pass through screen 60 when it is sufficiently fine. Should a still larger grind be desired, the other rod 68 and plates 67 and 67a can be moved to their upper position, thus exposing screen 61. The material will now pass through screen 61 when it becomes sufficiently ground. The material passing through the various screens falls into the bottom of chamber 10j and is carried upward to the separator above mentioned where the material will be separated from the air and discharged. The air and any material not separated will return through conduit 84 and will be directed by plate 85 through hopper 82 and into the feed opening 10i. A continuous circulation of air is thus provided through chamber 10j and to and from the separator. The plate 85 will swing outwardly to the desired position, such as that shown in full lines in Fig. 3, so that the air can pass by said plate. When the air draft is off, plate 85 will swing to the dotted line position, thus closing chute 84. The air will be forced through the described circuit by a fan (not shown). The rotatable beater produces some fan effect.

From the above description it will be seen that I have provided a simple and easily operated means for securing different grades of the ground material which can be operated by the operator on the floor above that on which the mill is supported so that the operator does not have to go to the lower floor to change any screen. The operator merely pulls up one or the other of rods 78 to uncover screens 60 or 61 as desired. The device has been amply demonstrated in actual practice, found to be very successful and efficient and is being commercially made.

*Hammer mills of the type herein disclosed are used to grind feed for poultry and farm animals. With the development of modern feeds it has become important to provide feeds of different grades of finesness. In practice there will always be a certain amount of fines or finely divided material. When one of the upper screens in applicant's machine has a larger mesh than the lower semi-cylindrical screen most of the ground produce will pass through said upper screen. The upper screens of different or larger mesh than the lower screen are thus very important in securing the different grades of grindings. It is however desirable to retain the lower screen.*

*The added claims in this reissue application are thus of great practical importance.*

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A hammer mill having in combination, a casing, a rotatable beater in said casing, a screen extending circumferentially about said beater at the lower side thereof, screens of different mesh at the upper part of said beater and at each side thereof respectively, said mill being adapted to be located on one floor of a building, plates covering said last mentioned screens respectively for rendering the same inoperative, means extending upwardly from said plates adapted to extend to the floor above said floor, said means being adapted to be engaged by the operator for moving either of said plates upwardly to expose either of said last mentioned screens for rendering the same operative.

2. The structure set forth in claim 1, said last mentioned screens converging upwardly.

3. A hammer mill having in combination, a casing, a rotatable beater in said casing for comminuting material, a screen extending circumferentially about the lower side of said beater, means for holding said screen [removably] in place, a pair of screens of different mesh disposed about the upper portion of said beater at opposite sides thereof respectively and of different mesh than said first mentioned screens, said last mentioned screens being held continuously in position, and means for rendering either of said last mentioned screens inoperative.

4. A hammer mill having in combination, a casing, a rotatable beater in said casing, a screen extending circumferentially about said beater at the lower side thereof, screens of different mesh at the upper part of said beater and at each side thereof respectively, plates covering said last mentioned screens, means connected to said plates for moving the same upwardly independently to uncover either of said last mentioned screens, and means at the lower ends of said screens for wedging said plates and holding the same in place over said screens.

5. A hammer mill having in combination, a casing, a rotatable beater in said casing, a screen extending circumferentially about said beater at the lower side thereof, screens of different mesh at the upper part of said beater and at each side thereof respectively, plates covering said last mentioned screens, means connected to said plates for moving the same upwardly independently to uncover either of said last mentioned screens, and rollers on said plates supporting the same for easy movement.

*6. A hammer mill having in combination, a housing, a rotatable shaft in said housing, a plurality of pivotally mounted swinging beater blades secured to said shaft, a substantially semi-cylindrical screen disposed at one location about said beater blades, means supporting said screen for easy removal thereof, a second screen entirely at one side of said housing and at one side of a vertical plane through the axis of said shaft and at another location about said beater blades, said second screen comprising small openings spaced a small distance from each other both horizontally and vertically and surrounded by solid material and removable means securing said second screen in place, said second screen being of different mesh than said first mentioned screen.*

*7. The structure set forth in claim 6, said second screen being substantially flat and in one plane from its upper end for a substantial part of its length and extending at an angle to a vertical plane extending through the axis of said shaft.*

*8. A hammer mill having in combination, a housing, a rotor comprising a rotatable shaft in said housing, a plurality of pivotally mounted swinging beater blades secured to said shaft, means for directing material to be ground into said housing at one end of said rotor and generally in a direction longitudinally of said shaft, a substantially semi-cylindrical continuous screen disposed below said beater blades, means supporting said screen for easy removal thereof, a pair of screens disposed above said shaft and spaced from said beater blades and disposed at the sides of said housing and at each side of a vertical plane passing through the axis of said shaft respectively, said pair of screens having comparatively small holes therein spaced a small distance both horizontally and vertically said pair of screens being removably mounted and being of different mesh than said first mentioned screen.*

References Cited in the file of this patent or the original patent

UNITED STATES PATENTS

| | | |
|---|---|---|
| 43,248 | Wheeler et al. | Jan. 21, 1864 |
| 335,827 | Mead | Feb. 9, 1886 |
| 807,136 | Spurgin | Dec. 12, 1905 |
| 1,125,137 | Liggett | Jan. 19, 1915 |
| 1,359,426 | Plaisted | Nov. 16, 1920 |
| 1,374,207 | Jacobson | Apr. 12, 1921 |
| 1,627,766 | Bergman | May 10, 1927 |
| 1,654,263 | Kidd | Dec. 27, 1927 |
| 1,698,758 | Knittel | Jan. 15, 1929 |
| 1,721,594 | Hardinge | July 23, 1929 |
| 1,973,074 | Howes | Sept. 11, 1934 |
| 2,125,993 | Dillinger | Aug. 9, 1938 |
| 2,227,090 | Hughes | Dec. 31, 1940 |
| 2,258,537 | Calkins | Oct. 7, 1941 |
| 2,328,170 | Schutte et al. | Aug. 31, 1943 |
| 2,488,714 | Delp | Nov. 22, 1949 |

FOREIGN PATENTS

| | | |
|---|---|---|
| 18,611 | Great Britain | of 1912 |
| 53,549 | Norway | Feb. 12, 1934 |
| 358,200 | Italy | Apr. 8, 1938 |
| 472,243 | Germany | Feb. 26, 1929 |
| 630,671 | France | Dec. 7, 1927 |
| 680,164 | France | Jan. 17, 1930 |
| 703,825 | Germany | Mar. 17, 1941 |
| 798,382 | France | May 15, 1936 |